Dec. 8, 1942.    R. W. SHANNON    2,304,481
JOINT CONSTRUCTION
Filed March 19, 1940    2 Sheets-Sheet 1
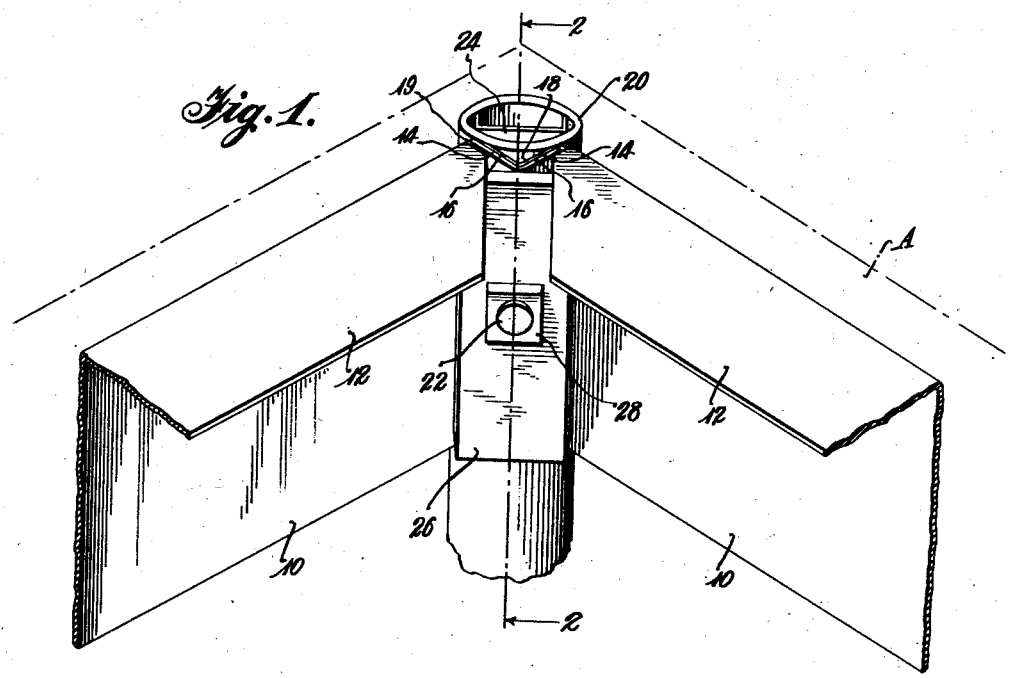
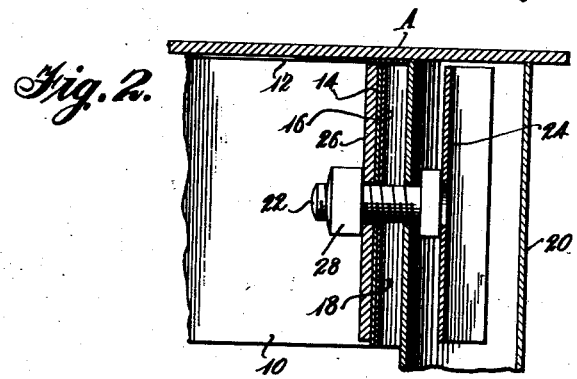
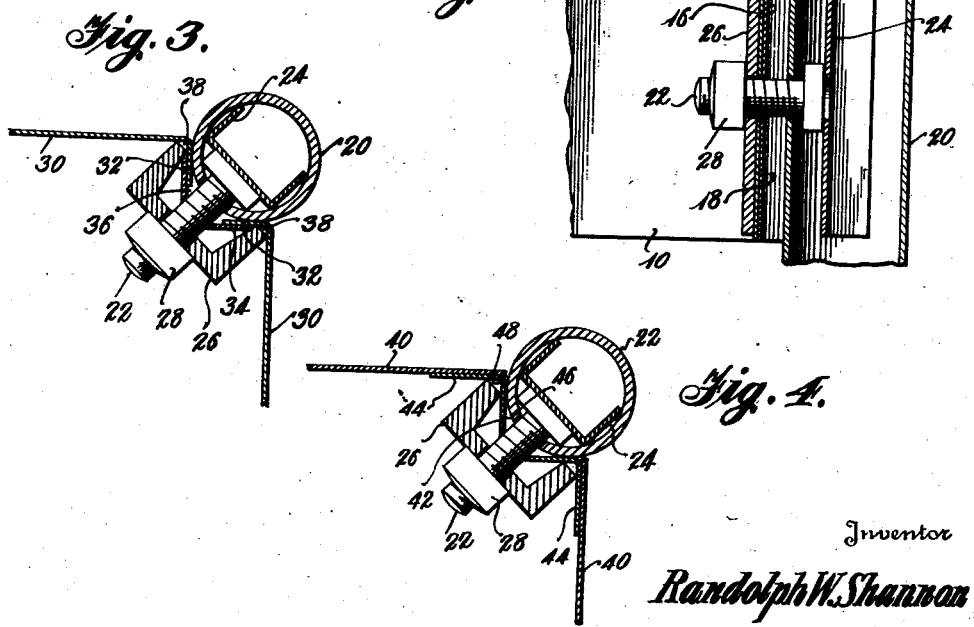
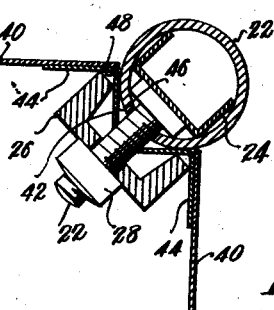
Inventor
Randolph W. Shannon
By Bacon + Thomas
Attorneys Dec. 8, 1942.  R. W. SHANNON  2,304,481
JOINT CONSTRUCTION
Filed March 19, 1940   2 Sheets-Sheet 2
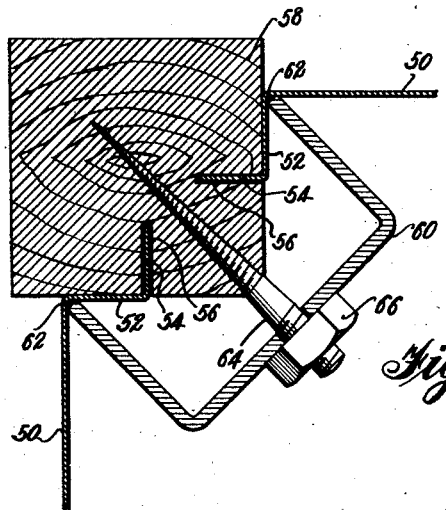
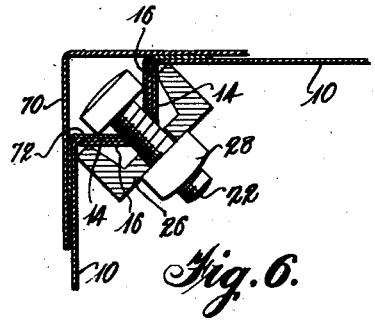
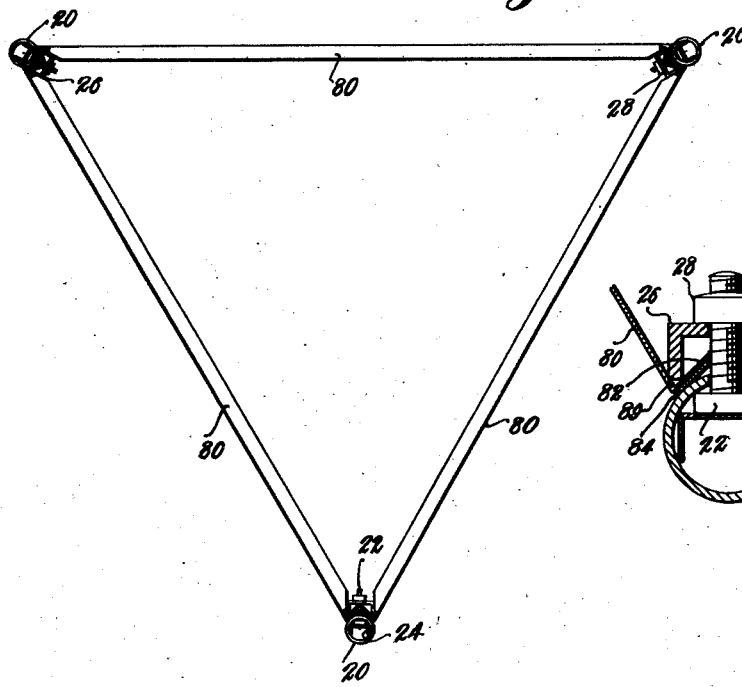
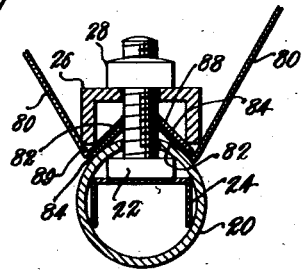
Inventor
Randolph W. Shannon
By Bacon & Thomas
Attorneys Patented Dec. 8, 1942

2,304,481

UNITED STATES PATENT OFFICE 2,304,481

JOINT CONSTRUCTION

Randolph W. Shannon, Philadelphia, Pa.

Application March 19, 1940, Serial No. 324,881

5 Claims. (Cl. 311—113)

This invention relates to improvements in joint constructions and while applicable to end or corner constructions for frame structures generally, it is particularly adaptable for use in connection with construction of furniture such as the connection of table legs to top supporting side rails.

It is an object of the invention to provide a strong and durable joint wherein one shape of rail member end or seat may be adapted to fit leg members of varying shapes and sizes. In its specific aspect, the invention provides for the use of a channel shaped clamp cooperating with an angular seat of variable degree in a novel manner to connect separable rail or frame members and/or secure a leg or other member in the angular seat formed by said rail or frame members.

It is another object to provide a construction having the leg positioned outside the rail members to promote an improved appearance in the completed device.

It is another object to provide a construction wherein the fastening or securing means for the legs and rail members is concealed from the outside of the table or other article but which at the same time is readily accessible for assembly in the completed joint. In the case of a tubular leg, the securing bolt, as will be observed later, may be concealed from the outside by having the hole in the inside wall of the tube sufficiently large to permit the bolt to be fed into it from the end of the tube.

Another advantage of the invention permits the storing and shipping of knock-down frame members such as table side rails and legs which may be inexpensively prefinished by dipping or spraying to avoid the increased expense of finishing the assembled structure and also avoiding any necessity for welding or brazing in assembly of the various individual frame members such as might impair the prefinished surfaces thereof.

Other objects and advantages of the invention will be apparent from the following detailed description thereof taken in conjunction with the accompanying drawings wherein preferred forms of the invention have been selected for exemplification.

In the drawings:

Figure 1 is a fragmentary perspective view of a joint construction embraced by my invention as applied to a table leg and side rail assembly;

Figure 2 is a sectional view taken on the line 2—2 of Figure 1;

Figure 3 is a horizontal section of a slightly modified form of the invention;

Figure 4 is a view similar to Figure 3 but of another form of the invention;

Figure 5 is a horizontal section of a further form of the invention involving the use of a solid leg;

Figure 6 is a horizontal section of still another form of the invention involving the use of an angular hollow leg;

Figure 7 is a plan view of a table rail and leg assembly illustrating the adaptability of the invention to a three-leg support; and Figure 8 is a horizontal sectional view taken at one of the leg joints of Figure 7.

Referring more particularly to the drawings wherein like numerals refer to like parts, the side rails or frame members 10 of Figure 1, preferably of metal, may be in the form of angle girders having inwardly bent horizontal flanges 12 adapted to support a table top or the like shown in fragment at A in the manner disclosed in my copending application Serial No. 167,320, filed October 4, 1937, if desired. However, the rail or frame members 10, in accordance with the present invention, may be of any other suitable cross-sectional configuration. Since the rails 10 are positioned at right angles to each other it it apparent that each of the four corner connections thereof may be constructed and arranged in the same manner as that shown in Figure 1 so that detailed illustration of one corner connection will suffice for all.

Each vertical end of each rail 10 is provided with an inwardly bent flange 14 extending at right angles to the rail 10 and a laterally bent flange 16 extending parallel to the rail, the flanges of each rail member 10 interfitting or nesting to form a right-angled seat 18. The rails 10 may be welded or otherwise secured at the seat forming portion, but preferably the rails are separate so as to be shipped in knocked-down condition and assembled as hereinafter described.

Received in the seat 18 is an external wall portion of a tubular cylindrical leg 20. As best shown in Figures 2 to 4, the tubular member 20 is provided with a bolt 22 projected through an aperture in the wall of the tube of sufficient size to permit the bolt to be fed into it from the end of leg 20 and held against movement relative to the tube by a block which may take the form of a channel member 24, the member 24 being positioned inside the tube and bearing on one side against the head of the bolt 22 and on the opposite side against an inner wall portion of the tubular member. The member 24 may be secured as by welding to the inner wall of the tube 20 and to the head of the bolt 22, if desired, but it has been found that a satisfactory construction is afforded if the member 24 is frictionally held in the tube 20 to frictionally hold the bolt 22 against inward or substantial rotary movement relative to the tube.

A channel shaped clamp 26 is positioned in the rear of the seat 18 and arranged with its channel portion facing the rear of seat 18 so that its ends bear against the opposed angular sides 19 at the rear of the seat 18. Obviously, the clamp may be other than channel shape, but a channel shape serves well for some purposes such as with tube 20 and is economical to make. Sometimes it may be desirable to have the clamp shaped to fit substantially parallel against the faces of angular sides 19 as well as against the inner faces of rails 10. The free extremity of bolt 22 projects through an aperture in the clamp member 26 receiving a nut 28 to securely clamp together the adjacent flanges 14 and 16 of the rails 10 and the wall portion of the tubular member 20 received in the seat 18 thereby fastening the rails 10 together and firmly holding the tubular member 20 in the seat 18 formed by the rail flanges.

In the form of the invention illustrated in Figure 3, adjacent ends of rail members 30 are provided with single inwardly bent right-angled flanges 32 which may be welded or otherwise secured to an angle member 34 to form with the flanges 32 a seat portion 36 having rearwardly disposed angular shoulders 38 similar to the seat 18 and angular edges 19 of Figure 1.

As shown in Figure 4, the rail members 40 may be formed without end flanges and an M-shaped angular member 42 is provided having rearwardly bent right-angled flanges 44 which may be welded or otherwise secured to the rails 40, preferably at the interior faces thereof. In this form of the invention the angle member 42 alone forms a seat 46 having angularly opposed edges or shoulders 48 at its rearward side, similar to the seat 18 and angular edges 19 of Figure 1.

As exemplified in Figure 5, the principles of the invention embodying the use of a channel-shaped clamp may be readily applied to solid legs such as wooden legs commonly in use and herein rails 50 are provided with right-angled flanges 52 at each end thereof, the flanges 52 being forwardly bent to provide flanges 54 each extending parallel to its respective rail 50 and each insertable in a groove 56 provided longitudinally of a solid leg 58. In this form of the invention it may be desirable to provide a modified channel-shaped clamping member 60 having elongated legs thereof bearing in shoulders 62 formed rearwardly of the meeting edges of rails 50 and flanges 52 and apertured in its body portion to receive a screw 64 which may be driven in the body of the leg 58, the screw being provided with a free projecting extremity to threadedly receive a nut 66 to securely clamp the rails 50 and leg 58 together. The clamping member, instead of being a simple channel shape, may also be shaped so as to fit parallel against the inner faces of flanges 52, as well as against the inner faces of rails 50.

The forms of the invention illustrated in Figures 1 to 4, while heretofore shown as used with tubular leg members, are equally as adaptable for use with leg members of other shapes and, as shown in Figure 6, the seat forming flange arrangement of Figure 1 may be readily clamped to an angular leg 70 through the medium of an M-shaped angular strip 72 welded or otherwise secured at its wing portions to opposite inner faces of the leg 70 so that the V-shaped body of the strip 72 may be received in the seat 18 formed by the flanges 14 and 16 of the rails 10, the channel-shaped clamp 26 serving to securely clamp the various parts together in the same manner as in Figure 1 except that with the hollow angular leg of Figure 6 no securing means for the head of the bolt 22 may be necessary since the head is prevented from turning by contact of the straight sides thereof with the straight interior sides of the M-shaped strip secured to the leg 70. The clamping member, instead of being a simple channel shape, may also be shaped so as to fit parallel against the faces of flanges 14 or 16, as well as against the inner faces of rails 10.

While the invention has up to this point been described only in connection with side rails or frame members disposed at right angles and forming four-legged supports, the joint construction of the invention is not restricted thereto but is adapted to a rail or frame assembly disposed in any desired relationship and having any desired number of legs, as exemplified in the triangular frame assembly as illustrated in Figures 7 and 8. As will be apparent in Figure 8, each rail member 80 may be provided with an end flange 82 extending at an acute angle and with a forwardly bent flange 84 extending at an obtuse angle with respect to its rail 80, the respective flanges 82 and 84 interfitting or internesting to form a right-angled seat 88 receiving an exterior portion of tubular leg 20 and being clamped together in the same manner as in Figure 1 except that in this instance the ends of the channel member 26 are drawn into the acute angled shoulders 89 disposed rearwardly of the seat 88.

The triangular rail assembly or base of Figures 7 and 8 is particularly useful with elongated tables wherein two of such bases may support the table top one at each elongated end thereof preferably with two legs of each base parallel with each end of the table top and the third leg toward the transverse center to provide support for the table top in lieu of additional reinforcing framework which might otherwise be necessary.

An example of the usefulness of a base with more than four legs and having adjacent rails disposed at an obtuse angle may be found in conjunction with a large round table top where it is desired to reduce the overhang of the circumference of the top relative to a four-sided supporting base by providing a base with a greater number of side rails and concomitant increase in the number of legs to afford greater support and if desired with the legs arranged to define spaces whereby the table may be designed to seat a predetermined number of persons.

It will be understood that the principles of the present invention extend to joint constructions generally whenever the same may be found suitable and are not restricted to table rail and leg structures such as herein described and illustrated which are merely exemplary.

What I claim is:

1. Furniture leg joint construction comprising, separable sheet metal rail members having at each end thereof laterally then forwardly bent flanges, the flanges of adjacent ends of different rails overlapping when the rails are assembled to form seats, a transversely extending leg received in each of said seats, a trough-shaped clamp member at the rear of said seat having its legs bearing against opposed sides of the rear of said seat, and means for drawing together said leg, clamp member and interposed seat forming overlapped flanges whereby to secure said rail members together and secure said leg in said seat.

2. A furniture leg joint comprising a pair of separable sheet metal rail members each having laterally then forwardly bent end flanges of said pair of rails, adjacent end flanges overlapping when the rails are assembled in angular relationship to form a seat, a tubular leg received in said seat, a trough-shaped clamp member at the rear of said seat having its legs engaging opposite sides of the rear of said seat, and a single means for securing said leg, clamp member and interposed seat forming overlapped flanges together whereby to secure said rail members together and secure said leg in said seat.

3. A furniture leg joint comprising a pair of sheet metal rail members each having flanged end portions, adjacent end flanges of said pair of rails cooperating when the rails are assembled in angular relationship to form a seat, a transversely extending generally cylindrical leg secured in said seat, the said leg having a hollow portion apertured to receive a bolting means head with the shank thereof projecting through said aperture, removable means inserted in said leg and extending between the bolting means head and an opposed wall of said hollow portion to immovably position said head, and a trough-shaped clamp member straddling the rear of said seat, the said seat and clamp member being apertured to receive the shank of said bolting means whereby the bolting means may draw together said leg, clamp member and interposed seat.

4. Furniture leg joint construction comprising separable sheet metal rail members having at each end thereof laterally then forwardly bent end flanges, the flanges of adjacent ends of different rails overlapping when the rails are assembled to form seats, a tubular leg received in each of said seats, each of said tubular legs being apertured to receive a bolting means head with the shank thereof projecting through said aperture, and a trough-shaped clamp member straddling the rear of each of said seats, the said overlapping seat forming flanges and clamp members being each apertured to receive the shank of their respective bolting means whereby each bolting means draws together a tubular leg clamp member and interposed seat forming flanges to secure said rails together and secure said tubular legs in said seats.

5. Furniture leg joint construction comprising separable sheet metal rail members having at each end thereof laterally then forwardly bent end flanges, the flanges of adjacent ends of different rails overlapping when the rails are assembled to form seats, a tubular leg received in each of said seats, each of said tubular legs being apertured to receive a bolting means head with the shank thereof projecting through said aperture, removable means inserted in said tubular leg and extending between the bolting means head and an opposed wall of said tubular leg, and a trough-shaped clamp member straddling the rear of each of said seats, the said overlapping seat forming flanges and clamp members being each apertured to receive the shank of their respective bolting means whereby each bolting means draws together a tubular leg, clamp member and interposed seat forming flanges to secure said rails together and secure said tubular legs in said seats.

RANDOLPH W. SHANNON.